Patented Apr. 5, 1938

2,113,293

UNITED STATES PATENT OFFICE 2,113,293

PREPARATION OF CELLULOSE DERIVATIVES

Joseph B. Dickey, Rochester, N. Y., assignor to Eastman Kodak Company, Rochester, N. Y., a corporation of New Jersey No Drawing. Application October 28, 1936, Serial No. 108,050

6 Claims. (Cl. 260—101)

The present invention relates to the preparation of esters, alkyl ethers or ether-esters of cellulose in which boron trifluoride is employed as the catalyst.

One object of my invention is to provide a method of preparing ethers or esters of cellulose with a catalyst which is easily obtained in an anhydrous condition. Another object of my invention is to provide a method of preparing cellulose derivatives with a catalyst which may be easily handled. Various other objects will appear herein.

I have discovered that organic acid esters, alkyl ethers or mixed ether-ester derivatives of cellulose may be prepared in a bath in which boron trifluoride is employed as the catalyst. By this method either cellulose or partially esterified cellulose may be employed as the starting material and the desired reagents may be caused to react thereon. My catalyst may be employed either alone or mixed with one or more of the catalysts which have been previously employed in similar processes. For instance, in preparing cellulose acetate, sulfuric acid may be employed as a catalyst auxiliary to the boron trifluoride catalyst.

The following examples illustrate the preparation of cellulose derivatives in accordance with my invention:

Example I

An acetylating bath was prepared by mixing 500 pounds of glacial acetic acid with 300 pounds of 85% acetic anhydride and bubbling boron trifluoride therein until approximately 2 pounds was dissolved. 100 pounds of refined cotton linters was introduced therein and thoroughly incorporated with the acetylating mixture. The mass was maintained at 60–65° C. until the cotton fibers had disappeared and the reaction mass became homogeneous. The resulting ester may be hydrolyzed by adding dilute acetic acid to the mass or it may be directly precipitated by pouring into water or methyl alcohol. It is preferred that the precipitating bath be agitated during the precipitation. The resulting product was cellulose acetate.

Example II 10 grams of boron trifluoride were incorporated in one kilogram of ethyl alcohol by bubbling it into the alcohol until that amount of boron trifluoride had been dissolved. 100 grams of clean cotton was incorporated therewith and thoroughly mixed with the bath. The mass was maintained at 50° C. for 10 hours. The fibrous material was then separated from the liquid and thoroughly washed with water until all the reagents were removed therefrom. The resulting product was ethyl cellulose.

Example III 10 grams of boron trifluoride was bubbled into a kilogram of anhydrous ethyl alcohol. 100 grams of cellulose monoacetate was thoroughly incorporated with the mixture and the mass was maintained at a temperature of approximately 50° C. for 10 hours. The fibrous material was then separated from the liquid and washed. The resulting product was ethyl cellulose acetate. Various esterifiable cellulosic materials, especially those having a high alpha cellulose content, are suitable for use as the starting material in processes in accordance with my invention. Instead of refined cotton linters or clean cotton, tissue paper or refined sulfite wood pulp might be employed. If the use of a cellulose having a low cuprammonium viscosity is not objectionable, regenerated cellulose, such as from viscose or the cuprammonium process, may be employed.

Various inert organic solvents, such as chloroform, acetone, benzene, ethylene chloride, etc. may also be used in the reaction mixture, if desired. If sufficient benzene or carbon tetrachloride is employed in the acetylation, the cellulose acetate will not dissolve in the reaction mixture but will remain as a fibrous product.

The time of treatment will depend upon the various conditions in the reaction, such as the proportions of reagents, the temperature, and the amounts of catalyst which are employed. For instance, as a rule in the etherification of cellulose in accordance with my invention, 10 hours as specified in Example II will be unnecessary as the reaction would probably be completed in much less time. As the cellulose is not greatly affected by the etherification mixture which I employ, use of a greater time than is necessary presents no serious disadvantage.

It is to be understood that my invention is not limited by the examples given above, as the temperatures and conditions of reaction may be varied by the individual operator and still be within the scope of my invention providing boron trifluoride has been employed to facilitate that reaction.

Various organic acid esters of cellulose may be prepared by my invention. For instance, if the preparation of a cellulose acetate propionate or butyrate is desired, esterifiable cellulosic material may be treated with an esterification mixture containing propionic or butyric acid, acetic anhydride and boron trifluoride, as the catalyst. Although the example of acetylation shows the use of 2% of boron trifluoride, based on the cellulose, a larger proportion of catalyst which is employed will depend upon the conditions of esterification and the speed at which the reaction is to be carried out.

I claim:

1. A method of preparing an organic derivative of cellulose which comprises treating the cellulose with a reaction mixture containing boron trifluoride, as the catalyst therein.

2. A method of preparing an organic acid ester of cellulose which comprises treating esterifiable cellulosic material with an acylation mixture containing boron trifluoride, as the catalyst therein.

3. A method of preparing cellulose acetate which comprises treating cellulose with an acetylation mixture containing boron trifluoride, as the catalyst therein.

4. A method of preparing a cellulose ether which comprises treating an etherifiable cellulosic material with an etherification mixture of a liquid lower monohydroxy aliphatic alcohol and boron trifluoride.

5. A method of preparing an ethyl cellulose which comprises treating an esterifiable cellulosic material with an etherification mixture of ethyl alcohol and boron trifluoride.

6. A method of preparing ethyl cellulose acetate which comprises etherifying an incompletely acetylated cellulose with an etherification mixture of ethyl alcohol and boron trifluoride.

JOSEPH B. DICKEY.